(12) United States Patent
Soulhi et al.

(10) Patent No.: US 11,985,527 B2
(45) Date of Patent: May 14, 2024

(54) SYSTEMS AND METHODS FOR AUTONOMOUS NETWORK MANAGEMENT USING DEEP REINFORCEMENT LEARNING

(71) Applicant: Verizon Patent and Licensing Inc., Basking Ridge, NJ (US)

(72) Inventors: Said Soulhi, Boston, MA (US); Bryan Christopher Larish, Westfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/157,469

(22) Filed: Jan. 20, 2023

(65) Prior Publication Data

US 2023/0156501 A1    May 18, 2023

Related U.S. Application Data

(63) Continuation of application No. 17/101,749, filed on Nov. 23, 2020, now Pat. No. 11,601,830.

(51) Int. Cl.
*H04W 24/08* (2009.01)
*G06N 3/045* (2023.01)
(Continued)

(52) U.S. Cl.
CPC ............ *H04W 24/08* (2013.01); *G06N 3/045* (2023.01); *G06N 3/088* (2013.01); *G06N 10/60* (2022.01);
(Continued)

(58) Field of Classification Search
CPC ..................................................... H04W 24/08
See application file for complete search history.

(56) References Cited

U.S. PATENT DOCUMENTS 11,082,292 B2 * 8/2021 De Buitléir ............. H04L 41/16
11,264,009 B2 * 3/2022 Hori ..................... G06F 16/3329
(Continued)

FOREIGN PATENT DOCUMENTS

| CN | 110581834 | 12/2019 |
| CN | 112884030 | 6/2021 |

OTHER PUBLICATIONS

Schuld, et al., "An Introduction to Quantum Machine Learning", Sep. 2014, available at https://arxiv.org/pdf/1409.3097.pdf (visited Nov. 23, 2020).

*Primary Examiner* — Guang W Li

(57) ABSTRACT

A system described herein may provide a technique for analyzing metrics, parameters, attributes, and/or other information associated with networks or other devices or systems associated with high-dimensional data in order to determine potential configuration changes that may be made to such networks or other devices or systems in order to optimize and/or otherwise enhance the operation of such networks or other devices or systems. Multiple autoencoders associated with multiple dimensions may be used to calculate reconstruction errors or other features of data (e.g., metrics, parameters, etc.) that may be used to define operating or performance states of the network. Operating or performance states of network components may be mapped to quantum state objects ("QSOs") for analysis using artificial intelligence and/or machine learning techniques or other suitable techniques.

20 Claims, 12 Drawing Sheets

(51) Int. Cl.
  *G06N 3/088* (2023.01)
  *G06N 10/60* (2022.01)
  *H04L 41/16* (2022.01)
  *H04L 43/0817* (2022.01)
  *H04W 24/02* (2009.01)
  *H04W 28/02* (2009.01)

(52) U.S. Cl.
  CPC .......... *H04L 41/16* (2013.01); *H04L 43/0817* (2013.01); *H04W 24/02* (2013.01); *H04W 28/0268* (2013.01)

(56) References Cited

U.S. PATENT DOCUMENTS

| | | | |
|---|---|---|---|
| 2019/0104182 A1* | 4/2019 | Elzur | H04L 67/125 |
| 2020/0322367 A1* | 10/2020 | Salvat Lozano | H04L 41/5009 |
| 2021/0058424 A1* | 2/2021 | Chang | G06F 11/3409 |
| 2021/0126943 A1* | 4/2021 | Roychowdhury | G06F 21/57 |
| 2021/0152439 A1* | 5/2021 | Soulhi | H04L 43/04 |
| 2021/0168044 A1* | 6/2021 | Ogawa | H04L 41/12 |
| 2021/0203576 A1* | 7/2021 | Padfield | H04L 43/04 |
| 2022/0043811 A1* | 2/2022 | Salvat Lozano | H04L 41/5009 |
| 2022/0166495 A1* | 5/2022 | Liu | H04L 41/16 |
| 2022/0366155 A1* | 11/2022 | Morishita | G06N 3/08 |

* cited by examiner

SYSTEMS AND METHODS FOR AUTONOMOUS NETWORK MANAGEMENT USING DEEP REINFORCEMENT LEARNING

CROSS-REFERENCE TO RELATED APPLICATION

This Application is a Continuation of U.S. patent application Ser. No. 17/101,749, filed on Nov. 23, 2020, titled "SYSTEMS AND METHODS FOR AUTONOMOUS NETWORK MANAGEMENT USING DEEP REINFORCEMENT LEARNING," the contents of which are herein incorporated by reference in their entirety.

BACKGROUND

Wireless networks may implement various radio access technologies ("RATs"), such as a Fourth Generation ("4G") RAT, a Long-Term Evolution ("LTE") RAT, a Fifth Generation ("5G") RAT, or other RAT. Some wireless networks may provide wireless services (e.g., voice call services, data services, etc.) via different RATs, frequency bands, etc. using discrete sets of hardware, such as antennas and/or antenna arrays. Such services via different RATs, frequency bands, etc. may be associated with respective performance and/or configuration parameters, metrics, Key Performance Indicators ("KPIs"), or the like. Service degradations or disruptions associated with such services may be reflected by particular parameters, metrics, KPIs, or combinations thereof.

DETAILED DESCRIPTION OF THE PREFERRED EMBODIMENTS

The following detailed description refers to the accompanying drawings. The same reference numbers in different drawings may identify the same or similar elements.

Embodiments described herein provide for the use of artificial intelligence/machine learning ("AI/ML") techniques, deep reinforcement learning ("DRL") techniques, or other suitable techniques to manage and/or optimize network configurations and/or resources. In some embodiments, as described in more detail below, metrics, parameters, attributes, and/or other information associated with networks or other devices or systems may be analyzed in multiple dimensions (e.g., high-dimension data) in order to determine potential configuration changes that may be made to such networks or other devices or systems in order to optimize and/or otherwise enhance the operation of such networks or other devices or systems. For example, in accordance with embodiments described herein, multiple autoencoders associated with multiple dimensions may be used to calculate reconstruction errors or other features of data (e.g., metrics, parameters, etc.) that may be used to define operating or performance states of the network. Operating or performance states of network components may be mapped to quantum state objects ("QSOs") for analysis using AI/ML techniques or other suitable techniques. In accordance with some embodiments, such analysis may include identification and/or implementation of actions that may result in improved network performance. By applying reinforcement learning, including rewards and penalties, an autonomous network optimizer ("ANO") of some embodiments may optimize management of network resources without outside intervention (e.g., without requiring user input or supervision).

Figure 1:
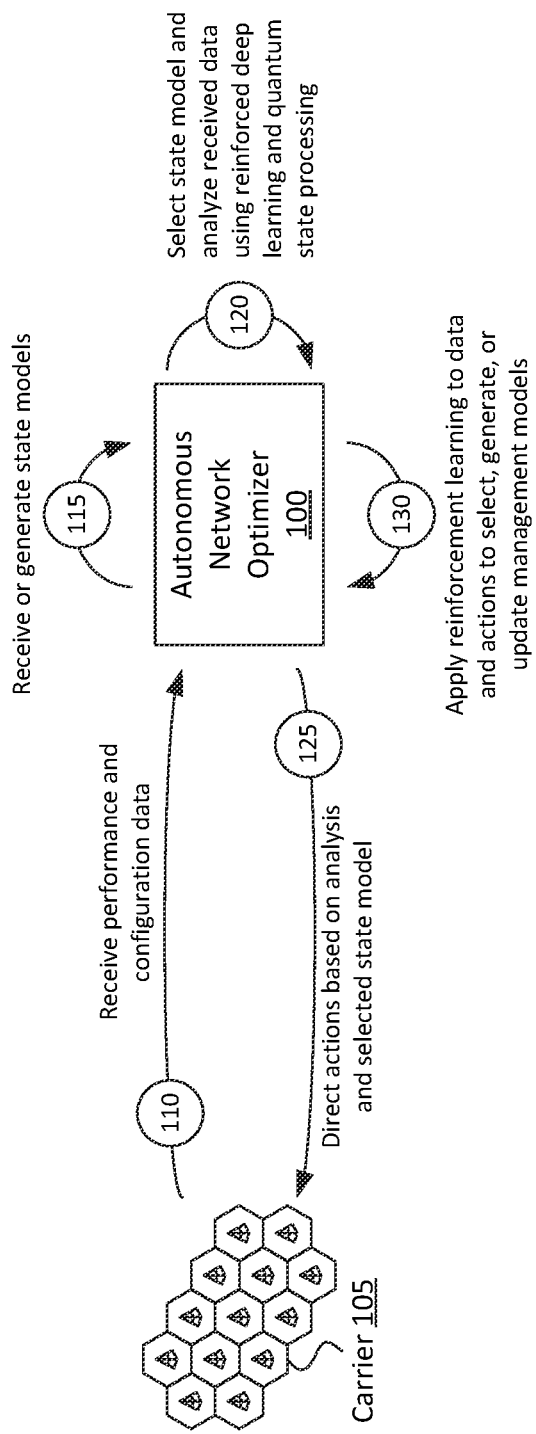
FIG. 1 illustrates an example overview of one or more embodiments described herein, in which network data may be monitored and autonomous management may be applied to the network.

FIG. 1 illustrates, for example, autonomous management of various network components using an ANO 100 of some embodiments. Each ANO 100 may be associated with one or more "sectors" representing a geographical region (e.g., city, state, province, etc.). Each sector may include multiple carriers 105. Each carrier 105 may be implemented by one or more RANs and/or other network components, as described in more detail in reference to FIG. 9 below. For example, in some embodiments, a particular carrier 105 may refer to a set of radio access technologies ("RATs"), such as a Code Division Multiple Access ("CDMA") RAT, a Fourth Generation ("4G") RAT, a Long-Term Evolution ("LTE") RAT, a Fifth Generation ("5G") RAT, or some other RAT. In some embodiments, carrier 105 may refer to a set of frequencies and/or bands implemented by one or more base stations of the one or more RANs. For example, one base station may implement one carrier 105 and/or multiple carriers 105. In some embodiments, a particular carrier 105 may be implemented by a discrete set of hardware, such as a particular antenna or set of antennas. Thus, while referred to herein as "carrier 105," such explanations may apply to one or multiple base stations, antennas, antenna arrays, or other devices or systems.

ANO 100 may receive (at 110) performance and/or configuration data from associated carriers 105. Performance data may include various key performance indicators ("KPIs") related to network performance attributes such as accessibility, retainability, integrity, connectivity, etc. For instance, KPIs may include a number, ratio, or other metric of events such as total calls, accepted calls, unaccepted calls, dropped calls, etc. KPIs may include and/or may be based on measured or calculated network quality or performance metrics, such as signal to noise ratio ("SNR") metrics, Signal-to-Interference-and-Noise-Ratio ("SINR") metrics, Received Signal Strength Indicator ("RSSI") metrics, Reference Signal Receive Power ("RSRP") metrics, Channel Quality Indicator ("CQI") metrics, and/or other measures of channel or signal quality. In some embodiments, KPIs may include and/or maybe based on measures of traffic performance, such as throughput, latency, jitter, packet error rate, packet loss rate, and/or other suitable metrics or values. Performance and/or configuration data may be captured, sampled, monitored, etc. on a periodic and/or intermittent basis. For example, such data may be monitored at regular intervals, at irregular intervals, in response to events or triggers, and/or on some other suitable basis.

Configuration data may include information related to the operation or configuration of carriers 105. For instance, each carrier 105 may be associated with one or more antennas or antenna arrays. Such arrangements of antennas or antenna arrays may include a Multiple-Input Multiple-Output ("MIMO") configuration, and/or a beamforming configuration in which a direction or alignment of each antenna, a transmission power associated with each antenna, and/or other parameters of such antennas or antenna arrays may be modified in order to optimally provide wireless coverage in a given area.

Configuration data may include or reflect actions implemented at each carrier 105. Such actions may include, for instance, actions related to an initial configuration, and/or actions related to modifying configurations such as initial or ongoing calibrations, responsive actions such as adjustments to configuration settings based on actual performance and/or configuration data, preventive actions such as adjustments to configuration settings based on predicted performance, and/or other appropriate modifications or updates. In some embodiments, such actions may include modifications, adjustments, and/or other actions with respect to a given carrier 105. Such actions modifications, adjustments, etc. may include physical adjustments to one or more antennas that operate according to a set of bands associated with carrier 105, such as adjustments to an azimuth angle of one or more antennas, tilt angle of one or more antennas, and/or other physical adjustments to one or more antennas or other physical components via which carrier 105 is implemented. In some embodiments, other types of adjustments may be made with respect to a given carrier 105, such as an adjustment of parameters associated with one or more devices or systems that implement carrier 105, and/or that are communicatively coupled to devices or systems that implement carrier 105. Such parameters may include transmission power of one or more antennas that operate according to a set of bands associated with carrier 105, queue weights implemented by one or more base stations associated with carrier 105, Quality of Service ("QoS") parameters, mobility parameters (e.g., neighbor cell lists, handover-related thresholds, etc.), and/or other suitable modifications, adjustments, or other actions. Configuration data may include log or history data indicating actions or modifications performed at certain times, and/or may include indications that no actions were implemented at certain times and/or during particular time windows.

ANO 100 may receive or generate (at 115) state models associated with performance of carriers 105. State models may include default or training models. State models may be received from another ANO 100 and/or other appropriate resources. State models may be generated and/or modified by ANO 100 based on data received from carriers 105. Additionally, or alternatively, ANO 100 may execute one or more simulations or other suitable operations to refine such models based on simulated and/or real-world feedback, such as continuous monitoring of one or more KPIs used as reinforcement learning rewarding mechanisms as described herein.

Based on the received performance and/or configuration data, ANO 100 may select (at 120) a state model and analyze the received data using deep learning and quantum state processing. Such data analysis will be described in more detail in reference to FIG. 2 below. Quantum state processing will be described in more detail in reference to FIGS. 3-5 below.

ANO 100 may select (at 120) one or more state models by comparing the received (at 110) performance and/or configuration data samples to attributes, characteristics, features, values, etc. of a candidate set of models received or maintained by ANO 100 and selecting one or more of the candidate set of models. For example, ANO 100 may perform a suitable similarity or correlation analysis to determine a measure of similarity (e.g., a score or other metric of similarity) between the received performance and/or configuration data and the set of candidate models, and may select a particular candidate model based on such measures of similarity. In some embodiments, for example, the selected model may have a highest measure of similarity out of the determined measures of similarity. In some embodiments, the selected model may have a measure of similarity that exceeds a threshold measure of similarity. In some embodiments, multiple models may be selected, such as in situations where similarity scores associated with multiple models exceed a threshold measure of similarity, are themselves within a threshold measure of similarity with each other, and/or in other suitable scenarios.

In some embodiments, different models may be associated with different sample rates (e.g., rates at which performance and/or configuration data is received (at 110)). For instance, an hourly sample rate of performance and/or configuration data may be associated with a daily state model, a daily sample rate of performance and/or configuration data may be associated with a weekly state model, and so on. In the example of daily state models, a given daily state model may include a set of a particular quantity (e.g., 12, 24, 26, 48, and/or some other quantity) of representative or nominal values (e.g., hourly values or values received on some other interval) that may be compared to a received (at 110) set of configuration and/or performance data samples. Some embodiments may include additional end-point or transitional data samples. For instance, 26 "hourly" samples in a daily slice, where the daily slice includes twenty-four hourly samples and the two additional, adjacent, samples.

As noted above, comparisons may be made by calculating various metrics between the available state models and the received performance and/or configuration data in order to determine respective measures of similarity between the received performance and/or configuration data and one or more candidate models. For instance, ANO 100 may calculate a similarity score, a match or mismatch score, or some other suitable measure of similarity (or dissimilarity) by comparing a difference between each sampled value and each representative value to the average of the sampled value and the representative value. As another example, quantum processing may be utilized to identify matching models, as described in more detail in reference to FIGS. 3-5 below.

Each state model may represent a network operating or performance state associated with one or more KPIs or other performance metrics. In some embodiments, such metrics may be on a per-carrier basis, a per-network slice basis (e.g., where different "slices" of a network refer to different instances of some or all of the components of a network, where different slices may provide differentiated levels of service), or on some other suitable basis. For instance, one state model may be associated with a 5% rate of dropped calls and another state model may be associated with a 10% rate of dropped calls. In some embodiments, state models may be associated with various performance targets or thresholds. For instance, state models may be associated with multiple ranges of values, each range associated with a level, score, descriptor, or other classifier of performance, such as "poor" for performance below a specified threshold, "adequate" for performance between two specified thresholds, "good" for performance above a specified threshold, etc. Thus, for instance, a "poor" state (e.g., "poor" in the context of KPIs related to call success or failure rate) may be associated with more than 5% of dropped calls, an "adequate" state may be associated with between 1% and 5% dropped calls, and a "good" state may be associated with less than 1% dropped calls.

In accordance with some embodiments, received state data may be evaluated using the selected state model by generating at least one QSO. Based on various calculated quantum metrics, described in more detail in reference to FIGS. 3-5 below, a set of potential or possible state transitions may be identified. Each possible state transition may be associated with a probability or other score or value.

Depending on the identified potential state transitions, ANO 100 may evaluate and/or select one or more potential actions may by identifying possible transitions and calculating associated probabilities based on application of each potential action. For instance, if good call performance (e.g., dropped calls below a threshold proportion, percentage, etc.) is likely based on the calculated probabilities, no action may be considered or implemented. However, if dropped call performance is expected to degrade (e.g., from a "good" state to an "adequate" state) based on received KPIs, performance, and/or configuration data, one or more actions associated with improving dropped call performance may be evaluated and/or implemented.

Actions may be implemented at a level that is proportional to the potential state transitions and associated probabilities. For instance, a "good" state that is expected to transition to an "adequate" state without intervention may be associated with a limited set of actions or limited application of the actions. For example, such limited set of actions may include a maximum modification of an azimuth angle of an antenna used for directed radio frequency ("RF") communications, such as in beamforming, MIMO configurations, etc. Such limited set of actions may include, for example, modifying an azimuth angle, tilt angle, and/or other directionality of such antenna by a predetermined amount, such as a predetermined number of degrees (e.g., 5 degrees) or other measure of modification. If, based on suitable analysis described herein, ANO 100 determines that an "adequate" state is likely to transition to a "poor" state, a broader set of actions may be considered and/or application may be increased. For example, an antenna angle modification limit may be expanded to a different predetermined amount, such as 10 degrees, and/or additional actions may be implemented. While the example above provides example modifications (e.g., beam angle modifications of 5 and 10 degrees), in practice, different values and/or types of modifications may apply.

ANO 100 may direct (at 125) actions to be implemented at carriers 105, based on analysis of received data and the selected state model. If ANO 100 identifies a recommended action, ANO 100 may send instruction messages or commands to various resources associated with carriers 105 in order to implement the identified action. As noted above, such actions may include actions related to beamforming, such as modifications of antenna angles, transmit power at one or more RF frequency bands, and/or other suitable actions. In some embodiments, such actions may include modifications of queue weights, Quality of Service ("QoS") treatment parameters, and/or other suitable actions.

ANO 100 may apply (at 130) reinforcement learning to data and actions (including state-action pairs) to select, generate, or update management models include state models, action models, transition models, and/or other appropriate models. Such application may be based on feedback from carriers 105 and/or other devices or systems, which may indicate the results or effects of the directed (at 125) actions. Such feedback may be determined, for example, by continuing to monitor and/or receive (e.g., as similarly discussed at 110) performance and/or configuration data from one or more carriers 105.

For instance, if an antenna alignment action results in improved performance (e.g., fewer dropped calls, a lower proportion of dropped calls, improved throughput, etc.) at a given carrier 105 based on a particular set of received performance and/or configuration data associated with carrier 105, the alignment action may be more likely to be recommended or implemented in future instances for the same or another carrier 105 with the same or similar received performance and/or configuration data as ANO 100 implements inter-carrier transfer learning. As another example, if increased transmission power does not result in improved dropped call performance, such an action may be less likely to be recommended or implemented in the future.

Figure 2:
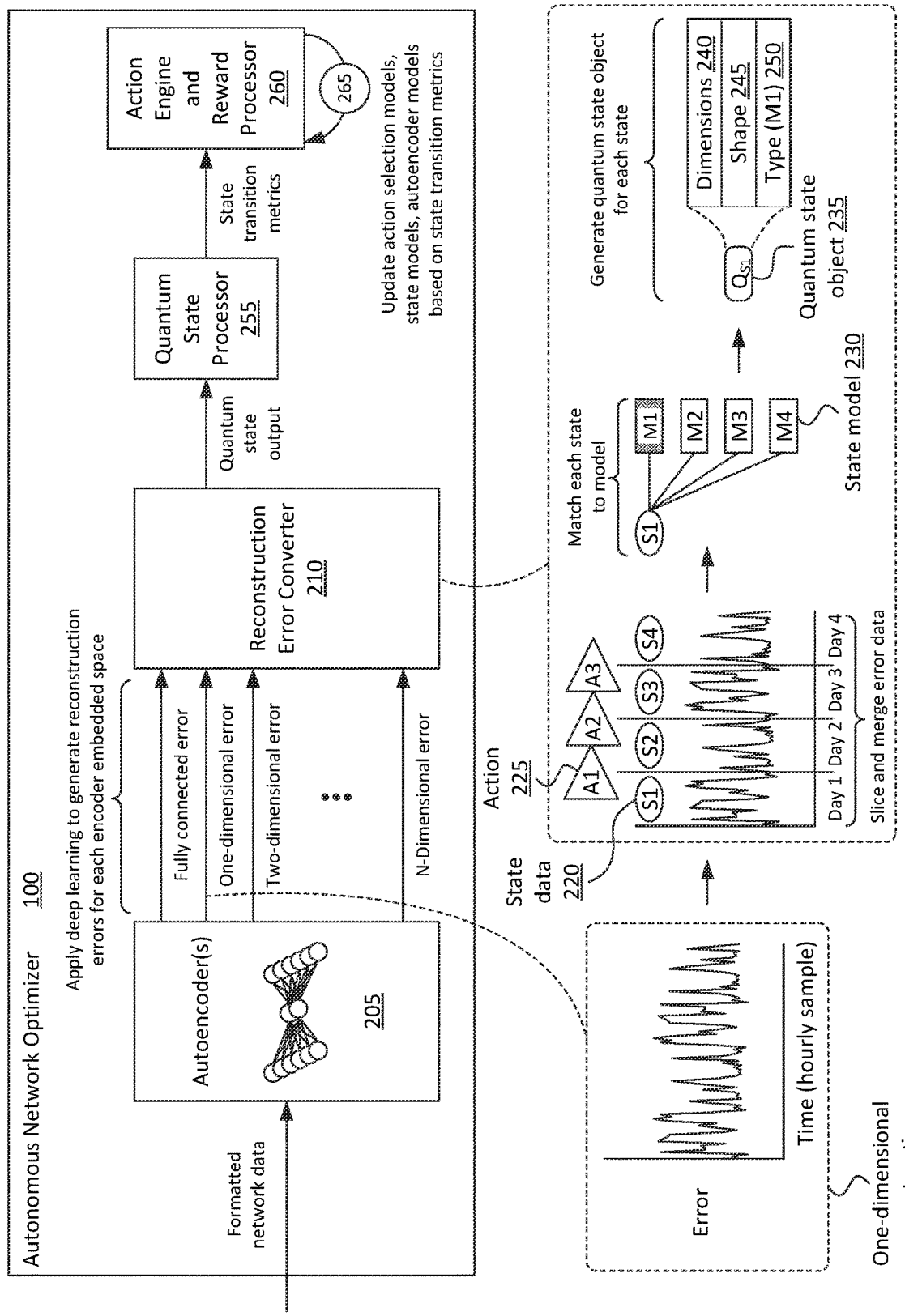
FIG. 2 illustrates an example of analyzing network data using deep learning, quantum state processing, and/or reinforcement learning, in accordance with some embodiments described herein.

FIG. 2 illustrates, for example, an analysis of network data using AI/ML techniques such as deep learning, quantum state processing, reinforcement learning, or other suitable techniques. As shown, formatted network data may be received by a set of autoencoders 205 of ANO 100. As referred to herein, a particular autoencoder 205 may refer to a particular set of operations performed on a set of data, where different autoencoders 205 may operate in different dimensions. "Dimensions," as referred to herein, may include the number of values needed to locate points or vectors (or degrees of freedom of points or vectors) within a coordinate system or other multi-dimensional space such a quantum state representation. The set of autoencoders 205 may include a fully connected autoencoder, and any number of additional autoencoders of varying dimensions. For example, some embodiments may include autoencoders analyzing input data (e.g., network KPI information and/or other network-related information) in one dimension, two dimensions, and three dimensions. In some embodiments, autoencoders 205 may operate in different sets of dimensions. In some embodiments, the set of autoencoders 205 may include convolutional autoencoders or other neural network techniques which may operate in a single dimension or multiple dimensions. For example, "neurons" of such convolutional autoencoders or other neural network techniques may operate in a single dimension or multiple dimensions.

Each autoencoder 205 may be, include, or implement a type of artificial neural network or other suitable technique that learns efficient data encoding and/or decoding schemes in an unsupervised manner. Autoencoders 205 may reduce the dimensionality of one or more data sets for more efficient analysis and/or processing that ignores or reduces signal noise. For example, each autoencoder may "encode" input data into a latent space of the autoencoder by reducing the dimensionality of the input (e.g., by mapping or otherwise reducing input data having a first quantity of dimensions to a reduced dimension representation including a lower second quantity of dimensions). The reduced dimension representation may be "decoded" to a representation having the same dimensionality as the input data. The difference between the decoded output and the unencoded input is referred to herein as a "reconstruction error."

Received data may be encoded and decoded using each autoencoder 205 and deep learning may be applied to generate reconstruction errors for each encoder embedded space. ANO 100 may be included in a feedback control loop that attempts to drive such reconstruction errors to zero.

Reconstruction error converter 210 may receive and process the reconstruction error data from autoencoders 205 to generate each QSO. In this example, a set of hourly samples for one-dimensional reconstruction error data 215 (e.g., reconstruction errors associated with an autoencoder having a one-dimensional latent space) may be received from autoencoders 205. Such processing may include "slicing" the received data reconstruction error data 215. For instance, in this example, hourly samples collected over a four-day period may be sliced into four sets of daily state data 220, each associated with hourly samples associated with a full 24-hour day. Each set of state data 220 may be associated with a set of applied actions 225, if any.

Reconstruction error converter 210 may merge the error data from the various autoencoders 205. Error data may be merged in various appropriate ways, such as calculating a weighted average of error data associated with each autoencoder 205, summation of errors across autoencoders 205, etc. In some embodiments, a softmax or normalized exponential function may be used to convert each of the merged values to a probabilistic value between zero and one.

The resulting merged, sliced, and normalized data may be matched by reconstruction error converter 210 to a state model 230. For instance, state data S1, which may be represented as a two-dimensional waveform as shown, may be mapped to state model M1, as indicated in FIG. 2 by shading in the box representing state model M1. State models 230 may each include a set of reference points that may be compared to the merged data included in state S1 to identify a matching state model. In some cases, a default or nominal state model may be selected if no matching model is identified, or if a matching score or metric does not exceed a specified minimum threshold.

Each state model 230 may be associated with a vector (e.g., a "ket" vector) that defines a mapping to a value for a specified function. The state data 220 and state model 230 may be used to generate a particular QSO 235 for each state. QSO 235 may include and/or may be generated using various parameters or attributes, such as dimensions 240 (e.g., 24 by 1, 26 by 1, and/or some other dimensions), shape 245 (e.g., a set of values such as hourly samples that may be used to define a waveform or other appropriate shape), and a type (e.g., the "ket" vector associated with state model M1 in this example).

QSOs 235 may be generated for each state across any number of KPIs. Each QSO 235 may be passed to quantum state processor 255 for analysis. Quantum state processor 255 may generate various state transition metrics to determine or represent the likelihood of transition between states. Such state transition metrics may include generation of a set of probability mass functions indicating a likelihood that any given state will transition to another given state. State transition metrics may be associated with specific state data 220, state models 230, actions 225, state-action pairs, and/or other appropriate models or elements.

The state transition metrics may be passed to action engine and reward processor 260 for action selection and/or implementation and reinforcement learning. The action engine and reward processor 260 may generate or indicate a particular action 225 to be implemented by or for carriers 105. Action selection or generation will be described in more detail in reference to FIG. 4 below.

Action engine and reward processor 260 may utilize reinforcement learning to update (at 265) action selection models, state models, autoencoder models, and/or other relevant models or components of ANO 100, based on the state transition metrics generated by quantum state processor 255 (and/or other relevant data). Reinforcement learning may utilize rewards and penalties to autonomously identify and implement actions that result in improved or optimized network performance. For instance, rewards may be associated with any action that results in an improved KPI (e.g., fewer dropped calls), while penalties may be associated with any action that results in a worsened KPI (e.g., more dropped calls).

Figure 3:
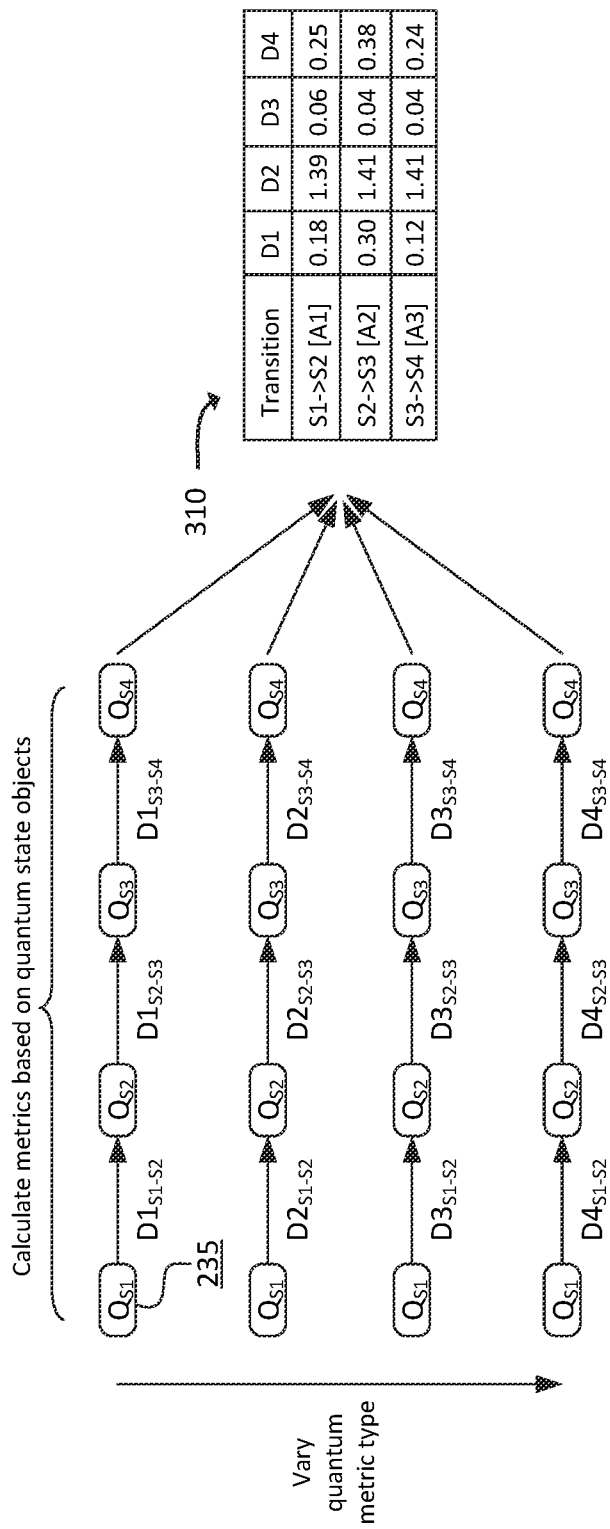
FIG. 3 illustrates an example overview of one or more embodiments described herein, in which quantum state objects may be used to calculate state transition metrics.

FIG. 3 illustrates, for example, calculation of state transition metrics based on QSOs 235. Each QSO 235 may be a multi-dimensional quantum representation generated based on state data 220, state model 230, and/or action 225. State transition metrics may be based on various types of quantum calculations (and/or other multi-dimensional space calculations). Such quantum calculations may include, for instance, Hilbert distance, Hellinger distance, fidelity or "closeness" of states, Bures distance, Trace distance, and/or other appropriate calculations.

Table 310 indicates various example distance values D1-D4 associated with various types of quantum calculations. In this example, D1 may be associated with Hilbert distance, D2 with Hellinger distance, D3 with a fidelity calculation, and D4 with Trace distance. The calculated metrics may be stored and/or sent to action engine and reward processor 260 for action reasoning and/or reinforcement learning. Machine learning may be applied to the various calculated metrics, where the machine learning may be used to update state models, action models, state transition models, and/or other appropriate elements of ANO 100.

Figure 4:
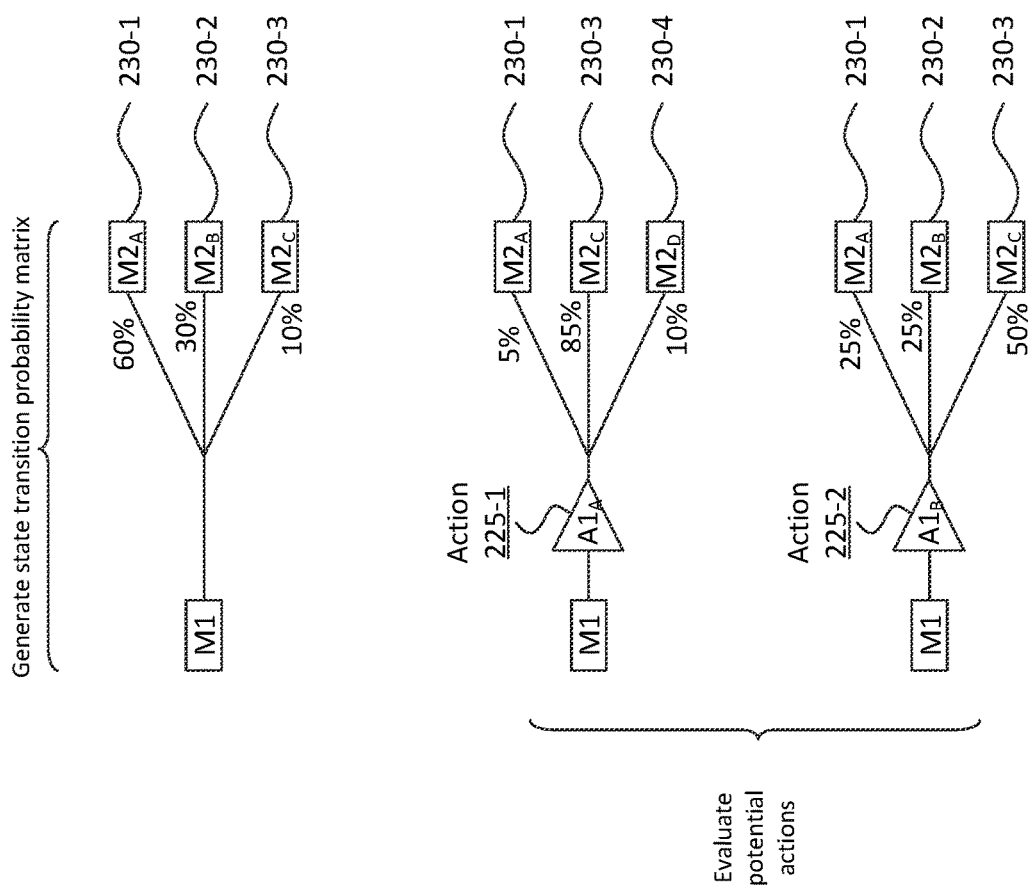
FIG. 4 illustrates an example overview of one or more embodiments described herein, in which a set of actions may be selected based on state transition modeling.

FIG. 4 illustrates, for example, action selection based on state transition modeling. Such modeling may be based on state models 230 and state transition models associated with quantum calculations such as described above in reference to FIG. 3. As shown, a state transition probability matrix may be generated. Such a probability matrix or probability mass function may indicate a probability that a particular state model, M1 in this example, will transition to another state model. While concepts associated with FIG. 4 are described in the context of a "matrix," in practice, other data structures or representations may be used, such as arrays, linked lists, trees, finite state machines, etc. Although such an approach is described in reference to state models, a similar approach may be applied to state data (e.g., by predicting a next state), or QSO data.

In this example, the probability of transition for state M1 is specified with respect to three potential post-transition states 230-1, 230-2, and 230-3. Probabilities may be calculated for any number of potential post-transition states. In this example, the probabilities sum to one hundred percent, but different embodiments may include different types of probabilities that may not necessarily sum to one hundred percent.

Such probability matrices may be utilized to evaluate potential actions and/or select one or more actions to implement. As shown, applying a first action 235-1 causes potential state 230-4 to replace potential state 230-2, and the probabilities associated with the states have been adjusted. Similarly, applying a second action 235-2 causes the probabilities associated with states 230-1, 230-2, and 230-3 to change.

Any number of potential actions 225 may be evaluated in a similar manner. Depending on the reward and/or penalty structure, an action may or may not be selected. For instance, if state 230-3 is an improvement from state M1 (e.g., having a lower percentage of dropped calls), whereas states 230-1, 230-2, and 230-4 are all deteriorations from state M1 (e.g., having a higher percentage of dropped calls), action 225-1 may be selected as the likelihood of transitioning to an improved state is increased and the likelihood of transitioning to a deteriorated state is reduced.

Figure 5:
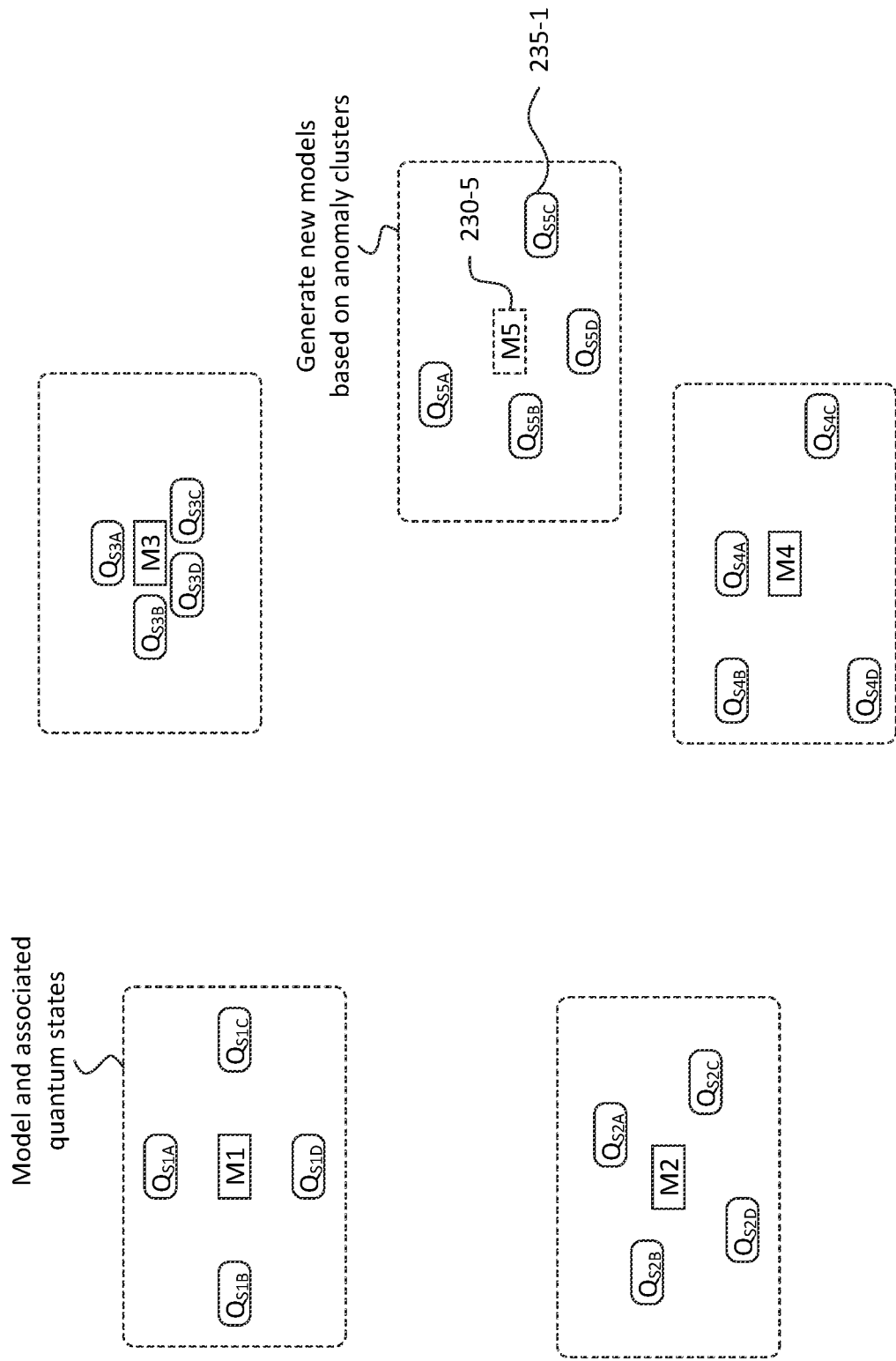
FIG. 5 illustrates an example overview of one or more embodiments described herein, in which quantum state objects may be grouped to generate or update state models.

FIG. 5 illustrates, for example, evaluation of QSOs 235 (as shown in FIG. 2) to generate or modify state models 230. Each state model 230 may be associated with various QSOs 235 (e.g., QSOs generated using the associated state model). In this example, QSOs are represented on a two-dimensional plot. Such a plot is not meant to be an accurate representation of multi-dimensional QSOs, but rather indicates how such objects may be associated based on calculated differences or other metrics.

Existing state models 230 may be updated such that the model reflects a center or minimal distance position from each associated QSO 235. Similarly, new models 230-5 may be generated based on anomaly clusters. Such clusters may include QSOs 235-1 that fall outside existing state model boundaries, exceed a maximum distance from an associated state model, and/or otherwise fail to satisfy some matching criteria.

Figure 6:
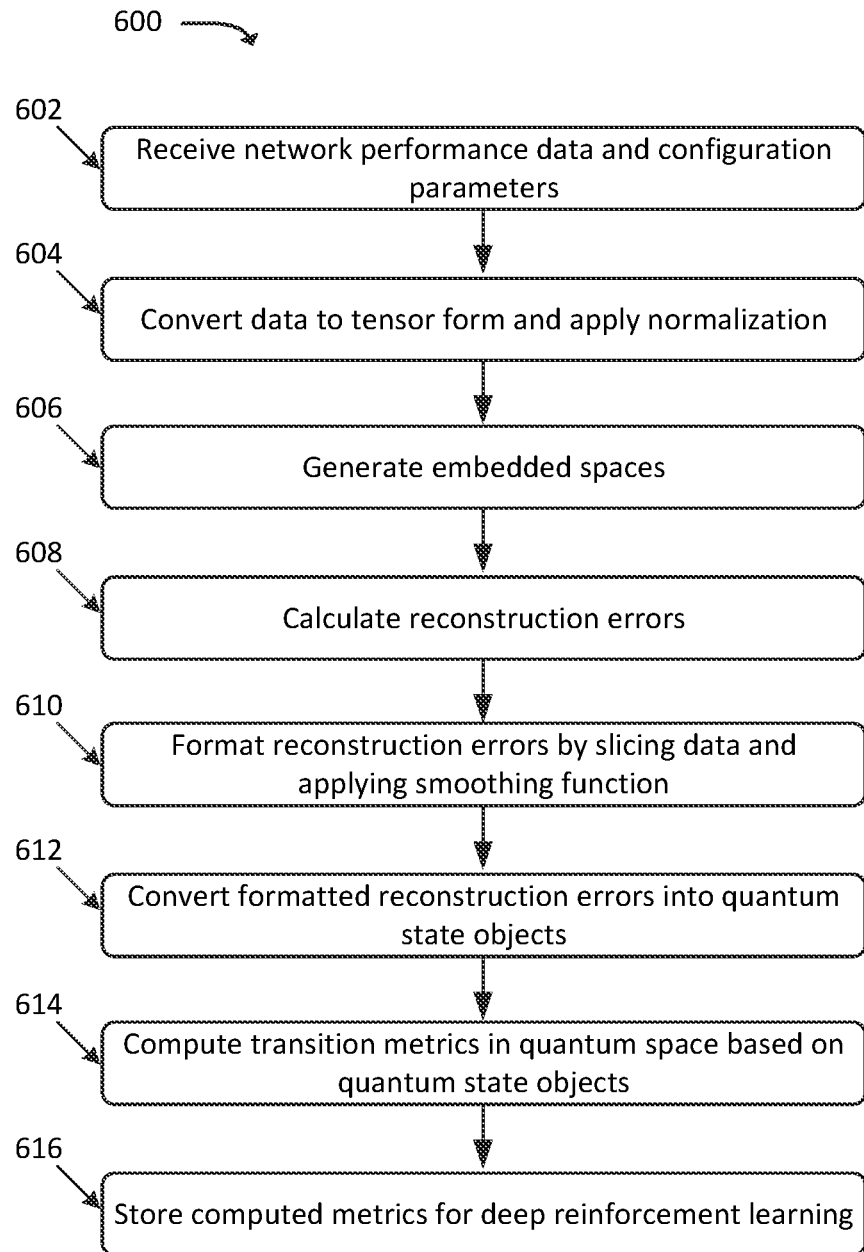
FIG. 6 illustrates an example process for mapping system performance to a state model and evaluating the state model using quantum representations, in accordance with some embodiments.

FIG. 6 illustrates an example process 600 for mapping system performance to a state model and evaluating the state model using quantum representations. In some embodiments, some or all of process 600 may be performed by ANO 100. In some embodiments, one or more other devices may perform some or all of process 600 (e.g., in concert with, and/or in lieu of, ANO 100).

As shown, process 600 may include receiving (at 602) network performance data and configuration parameters. Such data may be received at ANO 100 from various carriers 105. Performance data may include various KPIs across various types of performance, such as connectivity, accessibility, etc.

Process 600 may further include converting (at 604) the received data to tensor form and applying normalization. The specific tensor form(s) and/or normalization(s) may be associated with various vector space(s). Such vector spaces may be associated with autoencoder operation spaces.

Process 600 may additionally include generating (at 606) the embedded spaces for deep learning analysis. Process 600 may also include calculating (at 608) reconstruction errors. Such embedded spaces may be associated with the various autoencoders 205, which may be used to calculate the reconstruction errors across the various autoencoder dimensions.

Process 600 may further include formatting (at 610) reconstruction errors by slicing data and applying a smoothing function, such as a softmax function. In addition, reconstruction error data may be merged across the various autoencoders 205. Data may be sliced according to various pre-defined rules. For instance, hourly samples may be sliced at daily intervals. Samples may be collected at regular intervals such as each hour, minute, second, etc. Likewise, slicing intervals may include daily, hourly, by the minute, by the second, etc. Data may be sliced in various other appropriate ways, such as each ten samples, each hundred samples, each thousand samples, etc.

Process 600 may additionally include converting (at 612) the formatted reconstruction errors into QSOs. Such conversion may include selection of a matching state model and various vector algebra calculations based on the tensor data, sampled KPI data, selected state model (e.g., a ket type vector), and/or other relevant data.

Process 600 may also include computing (at 614) transition metrics in quantum space based on the QSOs. Such metrics may include various calculations such as Hilbert distance, Hellinger distance, fidelity or "closeness" of states, Bures distance, Trace distance, and/or other appropriate calculations.

Process 600 may further include storing (at 616) the computed metrics for DRL and/or action selection. Such computed metrics may be used to predict transition states, generate probability mass functions, evaluate actions, and/or otherwise evaluate network performance.

Figure 7:
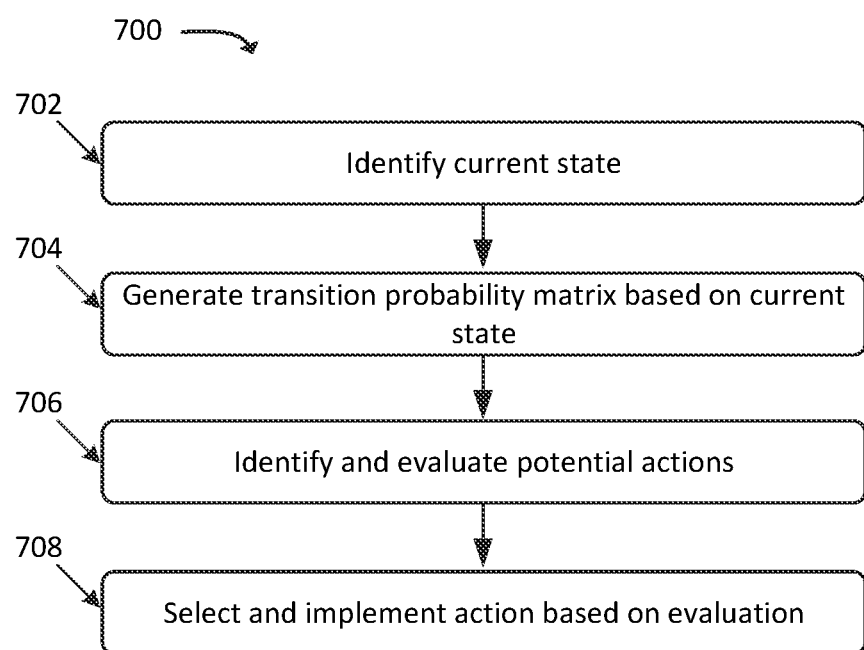
FIG. 7 illustrates an example process for selecting actions based on identified state models and transition probabilities, in accordance with some embodiments.

FIG. 7 illustrates an example process 700 for selecting actions based on identified state models and transition probabilities. In some embodiments, some or all of process 700 may be performed by ANO 100. In some embodiments, one or more other devices may perform some or all of process 700 (e.g., in concert with, and/or in lieu of, ANO 100).

As shown, process 700 may include identifying (at 702) a current state of each carrier 105. Such state identification may include matching received sample data to various models and identifying a matching state model.

Process 700 may further include generating (at 704) a transition probability matrix based on the current state. Such a probability matrix may be generated based on previously generated state transition metrics and/or metrics generated based on current state information.

Process 700 may additionally include identifying and evaluating (at 706) potential actions. A probability matrix may be generated for each potential action. Each probability matrix may indicate a set of potential transition states and a probability associated with each potential transition state.

Process 700 may also include selecting and implementing (at 708) an action based on the evaluation. An action, or set of actions, may be selected based on various reward and penalty policies associated with the various performance KPIs. For example, as discussed above, each probability matrix may be used to evaluate potential actions, and a particular action (or set of actions) may be selected based on a highest potential or probable (e.g., based on the probability matrices) reward, such as the highest measure of one or more performance KPIs or other metrics. In some embodiments, the selection may be based on identifying one or more actions for which the reward, measure of one or more performance KPIs, or the like exceed one or more threshold measures.

Figure 8:
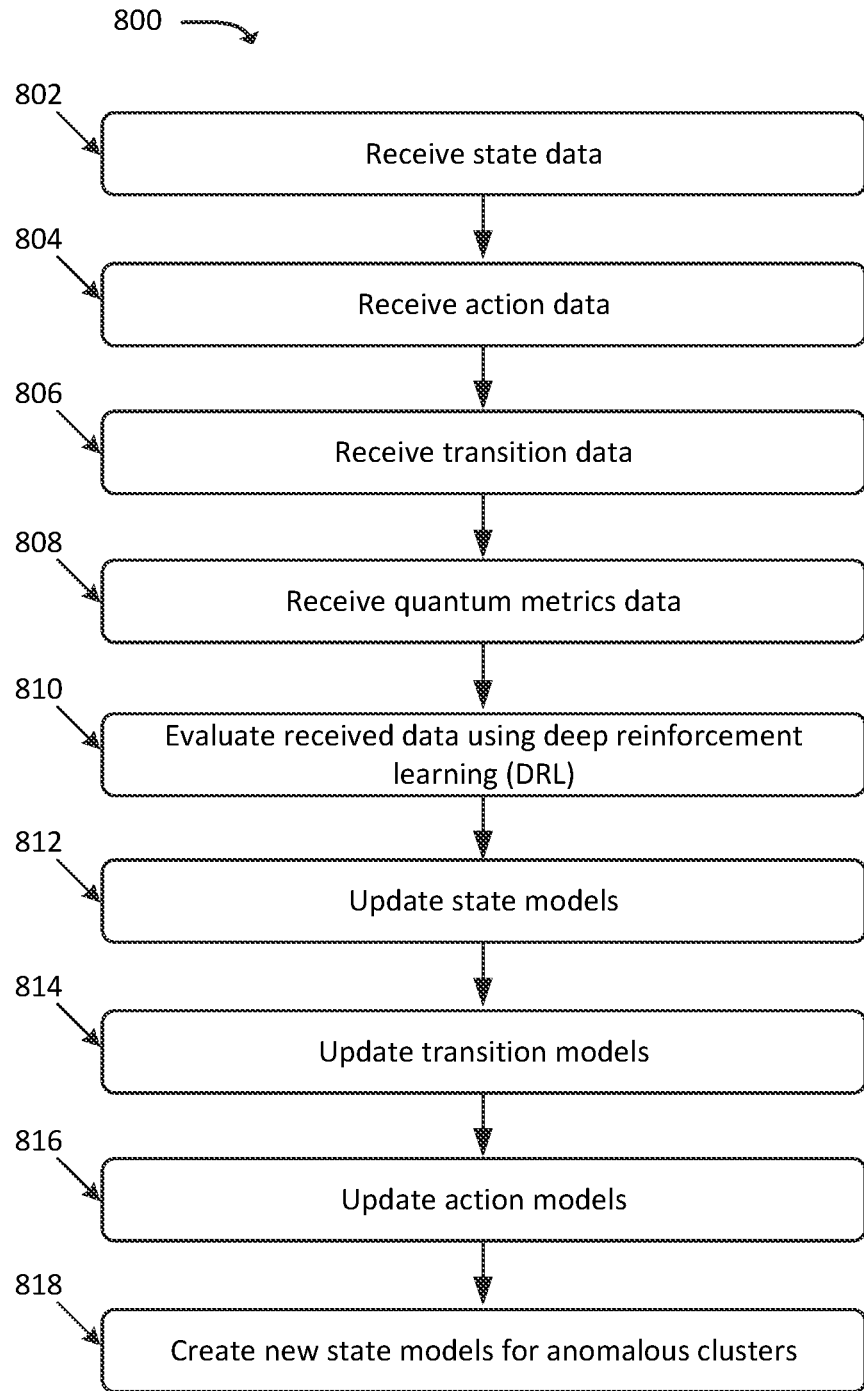
FIG. 8 illustrates an example process for applying deep reinforcement learning to state, transition, and action models, in accordance with some embodiments.

FIG. 8 illustrates an example process 800 for applying DRL to state, transition, and action models. In some embodiments, some or all of process 800 may be performed by ANO 100. In some embodiments, one or more other devices may perform some or all of process 800 (e.g., in concert with, and/or in lieu of, ANO 100).

As shown, process 800 may include receiving (at 802) state data. Such state data may include state models 230, sliced and merged state data 220, and/or other appropriate data. Such data may be collected by a resource such as ANO 100.

Process 800 may further include receiving (at 804) action data. Action data may include sets of applied actions 225 and associated state data 220 for state-action pairs.

Process 800 may additionally include receiving (at 806) transition data. Transition data may include actual state transitions indicate pre-transition and post-transition state, associated state models, and/or other relevant transition data.

Process 800 may further include receiving (at 808) quantum metrics data. Such data may include the various quantum distance calculations described above and/or other relevant quantum calculations.

Process 800 may also include evaluating (at 808) the received data using DRL. Such evaluation may include comparing outcomes, such as post-transition states, to pre-transition states and any applied actions. Based on various reward and penalty policies, actions may be associated with various states. Calculated quantum metrics may be utilized to compare states and evaluate the received data using DRL.

Process 800 may further include updating (at 810) state models. Such updating may include modifying shape, dimension, or mapping vector information associated with each state model such that the updated state models more accurately represent associated states.

Process 800 may additionally include updating (at 812) transition models. Updating transition models may include updating probability mass functions to more closely match actual outcomes.

Process 800 may also include updating (at 814) action models. Such action models may include expected changes to probability mass functions.

Process 800 may further include creating (at 816) new state models for anomalous clusters. Any groups of QSOs that are not closely associated with an existing state model may be used to generate new state models for future evaluations.

Figure 9:
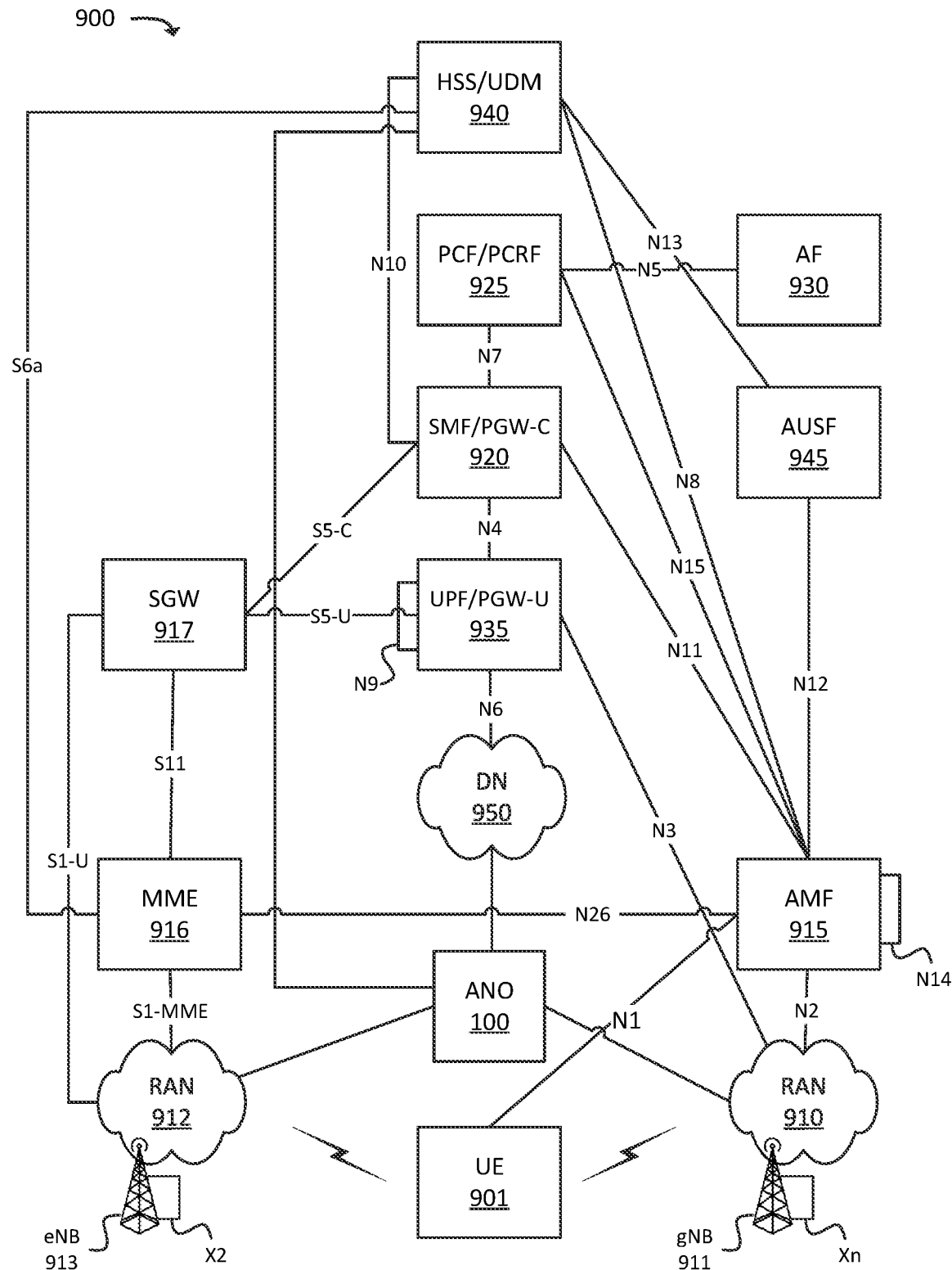
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 901, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950.

The example shown in FIG. 9 illustrates one example of each network component or function (e.g., one instance of SMF/PGW-C 920, PCF/PCRF 925, UPF/PGW-U 935, HSS/UDM 940, and/or 945. In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 901 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, SGW 917, and/or one or more other devices or networks) and may communicate the traffic to UE 901 via the air interface.

AMF 915 may include one or more devices, systems, Virtualized Network Functions ("VNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 901.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

Figure 10:
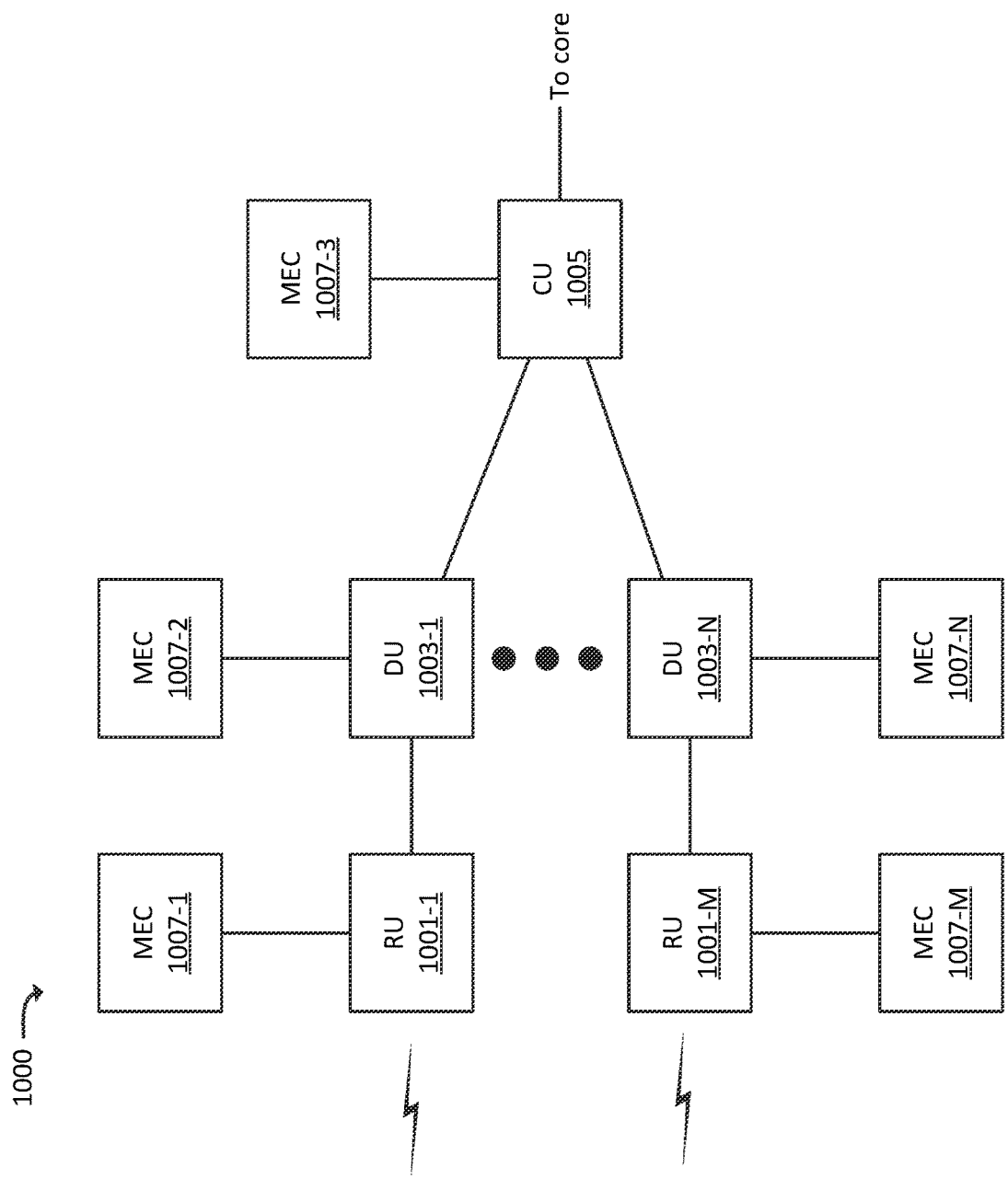
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more Multi-Access/Mobile Edge Computing ("MEC") devices, referred to sometimes herein simply as ("MECs") 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 901, via a respective RU 1001.

For example, RU 1001-1 may route some traffic, from UE 901, to MEC 1007-1 instead of to a core network (e.g., via DU 1003 and CU 1005). MEC 1007-1 may process the traffic, perform one or more computations based on the received traffic, and may provide traffic to UE 901 via RU 1001-1. In this manner, ultra-low latency services may be provided to UE 901, as traffic does not need to traverse DU 1003, CU 1005, and an intervening backhaul network between DU network 1000 and the core network. In some embodiments, MEC 1007 may include, and/or may implement, some or all of the functionality described above with respect to ANO 100.

Figure 11:
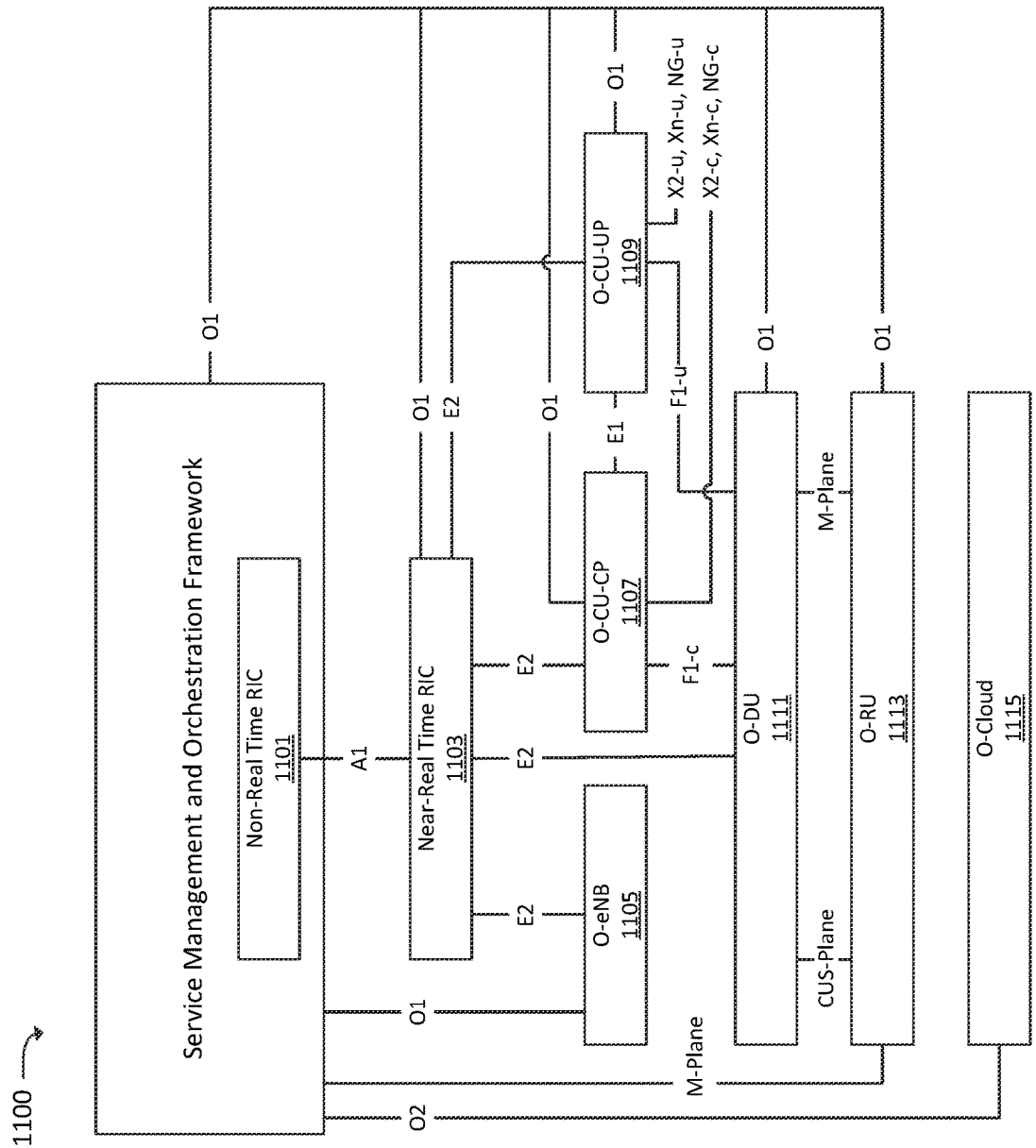
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. Similarly, Non-Real Time RIC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 901 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1107, O-CU-UP 1109, O-DU 1111, and/or O-RU 1113 (e.g., via an O1 and/or O2 interface).

Figure 12:
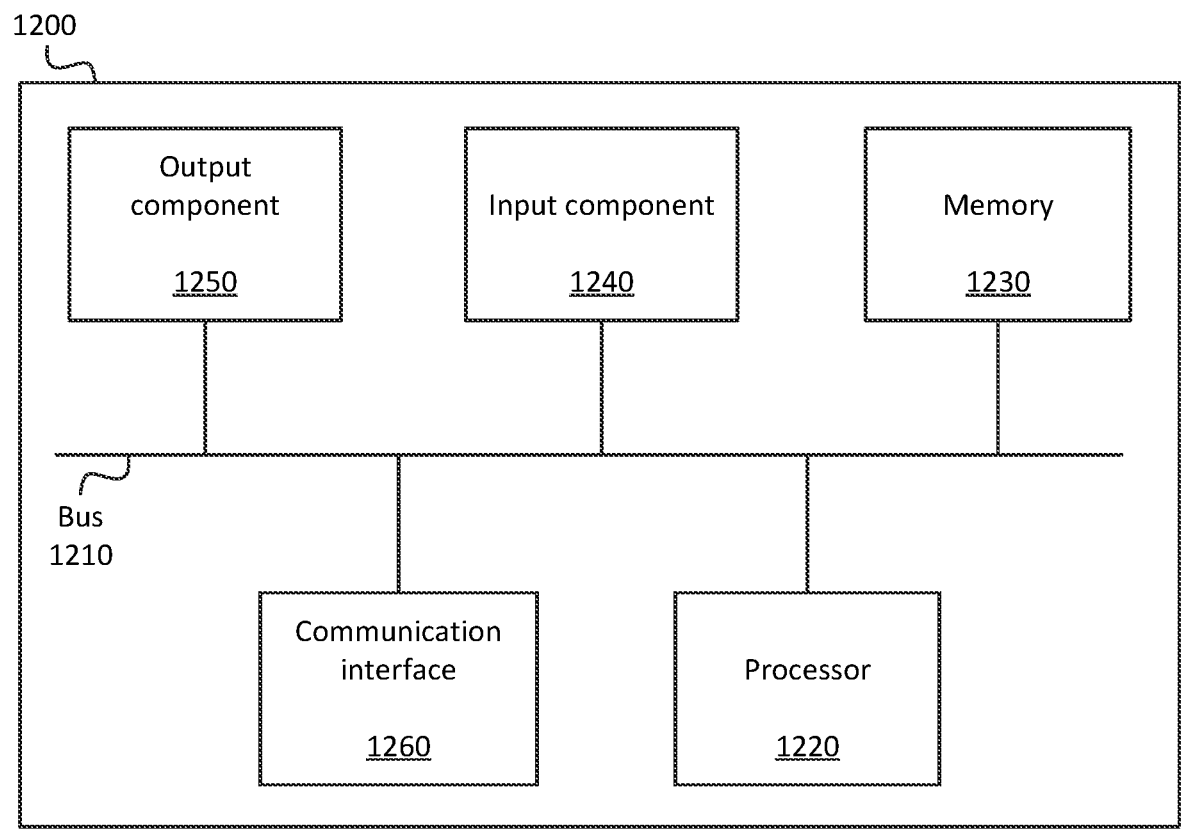
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4 and 6-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      generate a plurality of sets of encoded parameters by encoding a set of parameters in a plurality of different dimensions, wherein the plurality of different dimensions include at least a first dimension and a second dimension, wherein the plurality of sets of encoded parameters include:

a first set of encoded parameters encoded in a first dimension, wherein the first set of encoded parameters includes a first quantity of values to represent the set of parameters, and a second set of encoded parameters encoded in a second dimension, wherein the second dimension includes a second quantity of values to represent the set of parameters;

decode the plurality of sets of encoded parameters to generate a plurality of sets of decoded parameters;

calculate a plurality of reconstruction errors associated with the plurality of sets of decoded parameters and the set of parameters, wherein each respective reconstruction error of the plurality of reconstruction errors is calculated based on differences between a respective set of decoded parameters and the set of parameters;

calculate a multi-dimension reconstruction error based on the calculated plurality of reconstruction errors; and modify a configuration of a wireless network based on the calculated multi-dimension reconstruction error.

2. The device of claim 1, wherein the set of parameters includes a third quantity of values, wherein generating the plurality of sets of decoded parameters includes:

generating a first set of decoded parameters based on the first set of encoded parameters encoded in the first dimension, wherein the first set of decoded parameters includes the third quantity of values; and generating a second set of decoded parameters based on the second set of encoded parameters encoded in the second dimension, wherein the second set of decoded parameters includes the third quantity of values.

3. The device of claim 1, wherein the one or more processors are further configured to:

implement a first autoencoder that generates a first set of encoded parameters, of the plurality of sets of encoded parameters; and implement a second autoencoder that generates a second set of encoded parameters, of the plurality of sets of encoded parameters.

4. The device of claim 1, wherein the set of parameters includes a set of Key Performance Indicators ("KPIs") associated with the wireless network.

5. The device of claim 1, wherein the one or more processors are further configured to:

maintain a set of network state models indicating respective network states; and select, based on the calculated multi-dimension reconstruction error, a particular network state model of the plurality of network state models.

6. The device of claim 5, wherein the one or more processors are further configured to:

maintain a set of action models;

maintain information correlating respective action models to respective network state models; and select, based on the selected particular network state model, a particular action model of the set of action models, wherein modifying the configuration of the wireless network is based on the selected particular action model.

7. The device of claim 1, wherein modifying the configuration of the wireless network includes modifying one or more beamforming parameters of the wireless network.

8. A non-transitory computer-readable medium, storing a plurality of processor-executable instructions to:

generate a plurality of sets of encoded parameters by encoding a set of parameters in a plurality of different dimensions, wherein the plurality of different dimensions include at least a first dimension and a second dimension, wherein the plurality of sets of encoded parameters include:

a first set of encoded parameters encoded in a first dimension, wherein the first set of encoded parameters includes a first quantity of values to represent the set of parameters, and a second set of encoded parameters encoded in a second dimension, wherein the second dimension includes a second quantity of values to represent the set of parameters;

decode the plurality of sets of encoded parameters to generate a plurality of sets of decoded parameters;

calculate a plurality of reconstruction errors associated with the plurality of sets of decoded parameters and the set of parameters, wherein each respective reconstruction error of the plurality of reconstruction errors is calculated based on differences between a respective set of decoded parameters and the set of parameters;

calculate a multi-dimension reconstruction error based on the calculated plurality of reconstruction errors; and modify a configuration of a wireless network based on the calculated multi-dimension reconstruction error.

9. The non-transitory computer-readable medium of claim 8, wherein the set of parameters includes a third quantity of values, wherein generating the plurality of sets of decoded parameters includes:

generating a first set of decoded parameters based on the first set of encoded parameters encoded in the first dimension, wherein the first set of decoded parameters includes the third quantity of values; and generating a second set of decoded parameters based on the second set of encoded parameters encoded in the second dimension, wherein the second set of decoded parameters includes the third quantity of values.

10. The non-transitory computer-readable medium of claim 8, wherein the plurality of processor-executable instructions further include processor-executable instructions to:

implement a first autoencoder that generates a first set of encoded parameters, of the plurality of sets of encoded parameters; and implement a second autoencoder that generates a second set of encoded parameters, of the plurality of sets of encoded parameters.

11. The non-transitory computer-readable medium of claim 8, wherein the set of parameters includes a set of Key Performance Indicators ("KPIs") associated with the wireless network.

12. The non-transitory computer-readable medium of claim 8, wherein the plurality of processor-executable instructions further include processor-executable instructions to:

maintain a set of network state models indicating respective network states; and select, based on the calculated multi-dimension reconstruction error, a particular network state model of the plurality of network state models.

13. The non-transitory computer-readable medium of claim 12, wherein the plurality of processor-executable instructions further include processor-executable instructions to:

maintain a set of action models;

maintain information correlating respective action models to respective network state models; and select, based on the selected particular network state model, a particular action model of the set of action models, wherein modifying the configuration of the wireless network is based on the selected particular action model.

14. A method, comprising:

generating a plurality of sets of encoded parameters by encoding a set of parameters in a plurality of different dimensions, wherein the plurality of different dimensions include at least a first dimension and a second dimension, wherein the plurality of sets of encoded parameters include:
- a first set of encoded parameters encoded in a first dimension, wherein the first set of encoded parameters includes a first quantity of values to represent the set of parameters, and
- a second set of encoded parameters encoded in a second dimension, wherein the second dimension includes a second quantity of values to represent the set of parameters;

decoding the plurality of sets of encoded parameters to generate a plurality of sets of decoded parameters;

calculating a plurality of reconstruction errors associated with the plurality of sets of decoded parameters and the set of parameters, wherein each respective reconstruction error of the plurality of reconstruction errors is calculated based on differences between a respective set of decoded parameters and the set of parameters;

calculating a multi-dimension reconstruction error based on the calculated plurality of reconstruction errors; and modifying a configuration of a wireless network based on the calculated multi-dimension reconstruction error.

15. The method of claim 14, wherein the set of parameters includes a third quantity of values, wherein generating the plurality of sets of decoded parameters includes:

generating a first set of decoded parameters based on the first set of encoded parameters encoded in the first dimension, wherein the first set of decoded parameters includes the third quantity of values; and generating a second set of decoded parameters based on the second set of encoded parameters encoded in the second dimension, wherein the second set of decoded parameters includes the third quantity of values.

16. The method of claim 14, the method further comprising:

implementing a first autoencoder that generates a first set of encoded parameters, of the plurality of sets of encoded parameters; and implementing a second autoencoder that generates a second set of encoded parameters, of the plurality of sets of encoded parameters.

17. The method of claim 14, wherein the set of parameters includes a set of Key Performance Indicators ("KPIs") associated with the wireless network.

18. The method of claim 14, the method further comprising:

maintaining a set of network state models indicating respective network states; and selecting, based on the calculated multi-dimension reconstruction error, a particular network state model of the plurality of network state models.

19. The method of claim 18, the method further comprising:

maintaining a set of action models;

maintaining information correlating respective action models to respective network state models; and selecting, based on the selected particular network state model, a particular action model of the set of action models, wherein modifying the configuration of the wireless network is based on the selected particular action model.

20. The method of claim 14, wherein modifying the configuration of the wireless network includes modifying one or more beamforming parameters of the wireless network.

\* \* \* \* \*